US008716968B2

(12) United States Patent
Larson et al.

(10) Patent No.: US 8,716,968 B2
(45) Date of Patent: May 6, 2014

(54) LOW COST BLENDER CONTROL PERMITTING LOW ACTUATION FORCE SWITCHES

(75) Inventors: Eric K. Larson, Glenview, IL (US); Andy W. Tucker, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 299 days.

(21) Appl. No.: 13/142,310

(22) PCT Filed: Dec. 9, 2009

(86) PCT No.: PCT/US2009/067262
§ 371 (c)(1),
(2), (4) Date: Jun. 27, 2011

(87) PCT Pub. No.: WO2010/080310
PCT Pub. Date: Jul. 15, 2010

(65) Prior Publication Data
US 2011/0273124 A1     Nov. 10, 2011

Related U.S. Application Data

(60) Provisional application No. 61/142,815, filed on Jan. 6, 2009.

(51) Int. Cl.
*H02P 6/14*          (2006.01)

(52) U.S. Cl.
USPC ... 318/400.26; 318/806; 318/808; 318/254.1; 318/772; 388/907.5; 388/936; 388/836

(58) Field of Classification Search
USPC ............... 318/806, 808, 810, 811, 812, 772, 318/254.1; 388/907.5, 936, 836
See application file for complete search history.

(56) References Cited

U.S. PATENT DOCUMENTS

| 5,315,076 | A |   | 5/1994  | Renkes et al. |
|-----------|---|---|---------|---------------|
| 5,347,205 | A | * | 9/1994  | Piland ............................ 318/811 |
| 5,845,991 | A |   | 12/1998 | Sundquist |
| 6,609,821 | B2|   | 8/2003  | Wulf et al. |
| 7,623,329 | B2| * | 11/2009 | Williams et al. ................ 361/42 |

OTHER PUBLICATIONS

ISR for PCT/US2009/067262 dated Jan. 28, 2010.

* cited by examiner

*Primary Examiner* — Eduardo Colon Santana
*Assistant Examiner* — Iftekhar Mustafa
(74) *Attorney, Agent, or Firm* — Mark W. Croll; Paul F. Donovan

(57) ABSTRACT

A control circuit for a blender provides low-cost power conditioning through the use of a high resistance which provides temporary power for operation of low-voltage logic circuitry and low-voltage switches for a time sufficient to switch the motor on, and a lower resistance which provides sufficient power for maintaining the motor on state indefinitely as instructed by the low-voltage logic circuitry. Low average power dissipation is provided by powering the low-voltage logic circuitry and low-voltage switches using the high resistance in a standby mode and switching in the lower resistance only when the motor is activated.

10 Claims, 2 Drawing Sheets or equal to half the amount of power used by the second power conditioning circuit.

LOW COST BLENDER CONTROL PERMITTING LOW ACTUATION FORCE SWITCHES

CROSS-REFERENCE TO RELATED APPLICATIONS

This application is national phase of PCT/US2009/067262 filed Dec. 9, 2009, and claims the benefit of U.S. provisional application 61/142,815, filed Jan. 6, 2009.

BACKGROUND OF THE INVENTION

The present invention relates generally to household appliances and, in particular, to control circuitry for small appliances such as blenders and the like.

Electrical controls for food blenders of the type used for preparation of meals in a kitchen typically include a set of electrical switches or buttons on a front panel that may be used to control the blender motor. Such switches normally provide at least three operating modes: a "pulse" mode in which the blender operates only while a "pulse" button is pressed, an "on" mode in which the blender operates continuously after the "on" button is pressed and until released by pressing of an "off" button, and an "off" mode which cancels the "on" mode when the "off" button is pressed.

These electrical controls may be implemented using "electro-mechanical logic" that employs mechanical features to implement the above mode logic. In such electro-mechanical logic, the pulse button is spring-loaded to return after it is pressed and the on and off buttons are joined with a linkage so that the pressing of the off button releases the on button.

Alternatively, the electrical controls may be implemented using "electronic logic" in which each of the buttons is a momentary contact pushbutton and integrated logic circuitry implements the above modes. An advantage of electronic logic is that it works with low-voltage membrane switches requiring lower actuation forces and providing better sealing against contamination. Electronic logic and low-voltage membrane switches also make it easier to provide feedback using LEDs that can shine through transparent windows in the switch membrane. In contrast, electromechanical logic can result in buttons that are relatively hard to push, require substantial actuation distance, and are hard to seal against environmental contamination.

Low-cost blenders often cannot support electronic logic, principally because of the cost of circuitry necessary to convert 120 VAC power used for the blender motor to regulated, low-voltages required for typical logic circuits, and because of the cost of integrated circuits to implement the logic.

SUMMARY OF THE INVENTION

The present invention provides circuitry implementing electronic logic that is suitable for use with low-cost blenders having low-voltage membrane switches and the like. Low-cost power conversion necessary for such electronic logic is obtained by using two different regulation circuits. One circuit provides low power dissipation and low power suitable for standby use and for initial switching of power to the motor. The second circuit provides much higher power dissipation but also higher power suitable to maintain switching of power to the motor. The second circuit is connected to receive power only when the motor is connected. In this way, average power dissipation of power conversion is kept low by the intermittent motor cycling typical of a blender.

Specifically, the present invention provides a blender control circuit for a blender having a motor switchably connectable to a power line voltage. The blender control circuit includes an electrically controllable switch having a first terminal receiving the power line voltage and a second terminal providing the power line voltage to the motor and low-voltage logic circuitry receiving a low-voltage for controlling the electrically controllable switch. A first power conditioning circuit receives the power line voltage and provides the low-voltage to the low-voltage logic circuitry at a power level insufficient for continuous operation of the low-voltage logic circuitry and a second power conditioning circuit receives power line voltage from the second terminal of the electrically controllable switch and provides the low-voltage to the low-voltage logic circuitry at a power level sufficient for continuous operation of the low-voltage logic circuitry.

It is thus a feature of at least one embodiment of the invention to provide low-cost power conditioning with low standby power dissipation.

The low-voltage logic circuitry may communicate with membrane switches having contacts formed from printed circuit traces with limited current handling capacity.

It is thus a feature of at least one embodiment of the invention to permit the use of membrane switches in a low-cost blender.

The first power conditioning circuit and second power conditioning circuit may be voltage dropping resistors reducing the voltage of line power to the low-voltage. The resistors of the second power conditioning circuit may dissipate more power than the resistors of the first power conditioning circuit.

It is thus a feature of at least one embodiment of the invention to convert line voltage to low-voltage through simple resistive voltage reduction without excess power dissipation. Because the second powered conditioning circuit is only active when the motor is active, higher power dissipation and thus higher power production is possible in the second power conditioning circuit while maintaining a low average power dissipation.

The power dissipated by the second power conditioning circuit may be greater than a watt and the power dissipated by the first power conditioning circuit may be less than one-tenth of a watt. The electrically controllable switch may be an electromechanical relay having a coil acting on a magnetic armature to open and close contacts across the first terminal and second terminal and, in the low-voltage logic circuitry, provide power for activation of the coil from the low-voltage.

It is thus a feature of at least one embodiment of the invention to provide a low standby power and yet sufficient power during motor operation to hold closure on an electro-mechanical relay.

The blender control circuit may further include a voltage regulator limiting the voltage of the low-voltage. The voltage regulator may be a zener diode attached between the low-voltage and a ground point.

It is thus a feature of at least one embodiment of the invention to permit to a resistive voltage regulation to provide for substantially constant low-voltage supply using low-cost circuitry.

The blender control circuit may further include an energy storage element storing energy from the first power conditioning circuit to provide temporarily greater power to the low-voltage logic circuitry. The energy storage element may be a capacitor attached between the low-voltage and a ground point.

It is thus a feature of at least one embodiment of the invention to permit the standby power of the first power conditioning circuit to be lowered to a point where it is insufficient for continuous operation of the low-voltage logic circuitry by allowing power to be stored for momentary operation.

These particular features and advantages may apply to only some embodiments falling within the claims and thus do not define the scope of the invention.

DETAILED DESCRIPTION OF THE INVENTION

Figure 1:
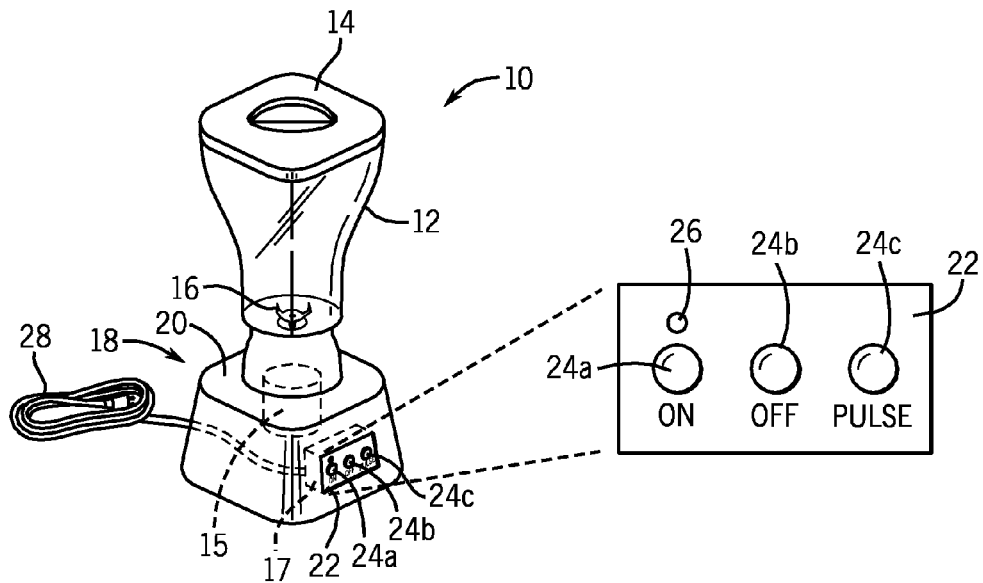
FIG. 1 is a perspective view of a blender suitable for use with the present invention providing on, off, and pulse control buttons.

Referring now to FIG. 1, a blender 10 may include a glass, plastic or metal blender container 12 typically having a removable lid 14 permitting foods (not shown) to be inserted in the container 12 and blended by an internally contained blender knife 16.

The blender container 12 may sit on top of a blender power unit 18 having a housing 20 containing a motor 15 and control electronics 17 to be described in more detail below. The front of the housing 20 may present a control panel 22 having a set of switches 24, preferably "tactile" type membrane switches, each providing momentary contact, single pole single throw operation and suitable for low-voltage control. As is understood in the art, such membrane type switches may include an outer membrane providing a hermetic seal against environmental contamination and may use contacts formed from printed circuit traces typically on at least one flexible membrane. Such membrane switches are low-voltage devices operating, for example, at 24 V and voltages much less than line voltage of 110-120 VAC.

In a preferred embodiment of the invention, the switches 24 include an "on" switch 24a, an "off" switch 24b, and a "pulse" or "momentary" switch 24c, providing a standard functionality described above. One of the switches may be associated with an LED indicator 26 visible through the membrane of control panel 22. The blender 10 receives line voltage 28 through a cord communicating with the control electronics 17.

Figure 2:
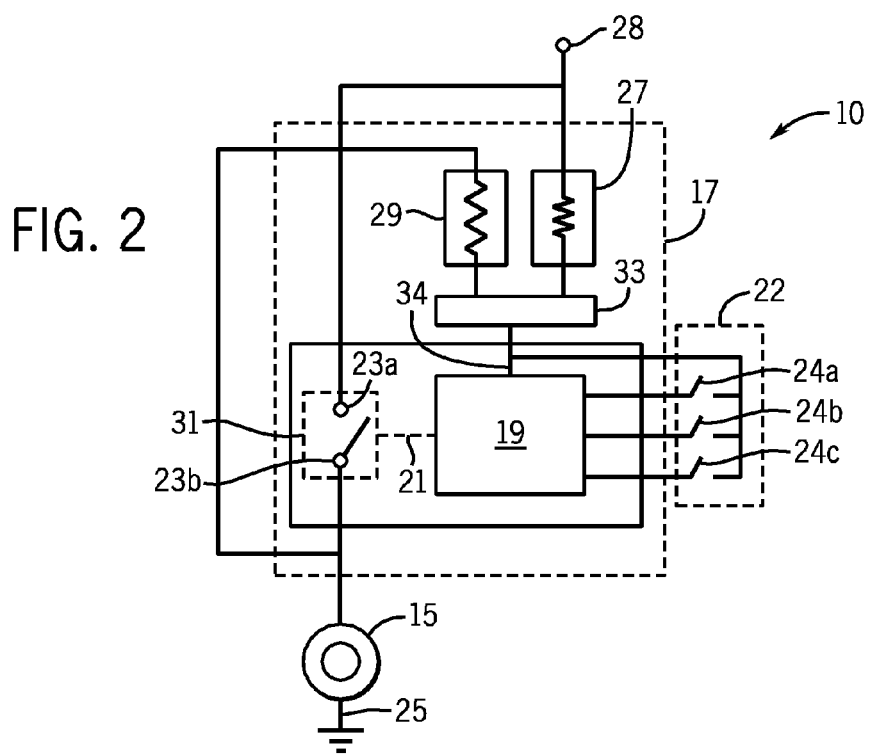
FIG. 2 is a block diagram of the principal components of the present invention.

Referring now to FIG. 2, the control electronics 17 may include a low-voltage logic circuit 19 receiving low-voltage DC power (e.g. 24 V) at a power terminal 34 to provide low-voltage power to power its circuitry and to provide power to switches 24a-c and receive low-voltage signals from the switches 24a-c.

The low-voltage logic circuit 19 uses the power from the power terminal 34 to develop a motor control signal 21 that may activate an electrically controllable switch 31. The electrically controllable switch 31 may provide a single pole, single throw contact set having a first terminal 23a connected to a source of line voltage 28 and a second terminal 23b connected to the motor 15 to provide power thereto. The remaining terminal of the motor 15 is connected to line ground 25. Accordingly, and as will be described in greater detail below, the low-voltage logic circuit 19 responding to signals from switches 24 controls the application of power to the motor 15 by providing a motor control signal 21 to the electrically controllable switch 31.

During a standby mode, when the blender 10 is plugged in but the motor 15 is not running and none of the switches 24 is pressed, low voltage power is provided to the low-voltage logic circuit 19 through a first power conditioning circuit 27. This first power conditioning circuit 27 has relatively low power dissipation (less than 0.03 W in one embodiment) and provides limited power to the low-voltage logic circuit 19.

Generally the power provided to the low-voltage logic circuit 19 by the first power conditioning circuit 27 is insufficient for continuous activation of the electrically controllable switch 31 providing, for example, several milliamps of current flow in contrast to tens of milliamps required by the motor control signal 21 to activate the electrically controllable switch 31. Nevertheless, the first power conditioning circuit 27 provides sufficient power from for the logic circuitry of low-power logic circuit 19 before activation of the electrically controllable switch 31 and, with energy storage, can provide a temporary activation of the electrically controllable switch 31.

For this purpose, an energy storage element 33 is interposed between the first power conditioning circuit 27 to store energy during the standby mode to provide the low-voltage logic circuit 19 sufficient power reserves to temporarily activate the electrically controllable switch 31 in response to activation of either switch 24a or switch 24c.

Upon closure of the electrically controllable switch 31, line voltage 28 is applied to the motor 15 and also to a second power conditioning circuit 29. This second power conditioning circuit 29 also provides power to the low-voltage logic circuit 19 through the energy storage element 33 but has relatively high power dissipation (on the order of 3 W in one embodiment). Nevertheless the second power conditioning circuit 29 provides greater power to the low-voltage logic circuit 19, power on the order of tens of milliamps and sufficient for continuous activation of the electrically controllable switch 31. This second power conditioning circuit 29, if operated continuously, would produce undesirable power drain and heating, but is operated only while the motor 15 is running and thus is acceptably limited. The second power conditioning circuit 29 may also benefit from a cooling airflow of a fan optionally associated with motor 15. In this way, continuous power is provided to the low-voltage logic circuit 19 during motor operation without reliance on the energy storage element 33. Because the energy storage element 33 must provide only sufficient energy storage for a brief period of time for closure of the electrically controllable switch 31, the energy storage element 33 may be modestly sized.

Figure 3:
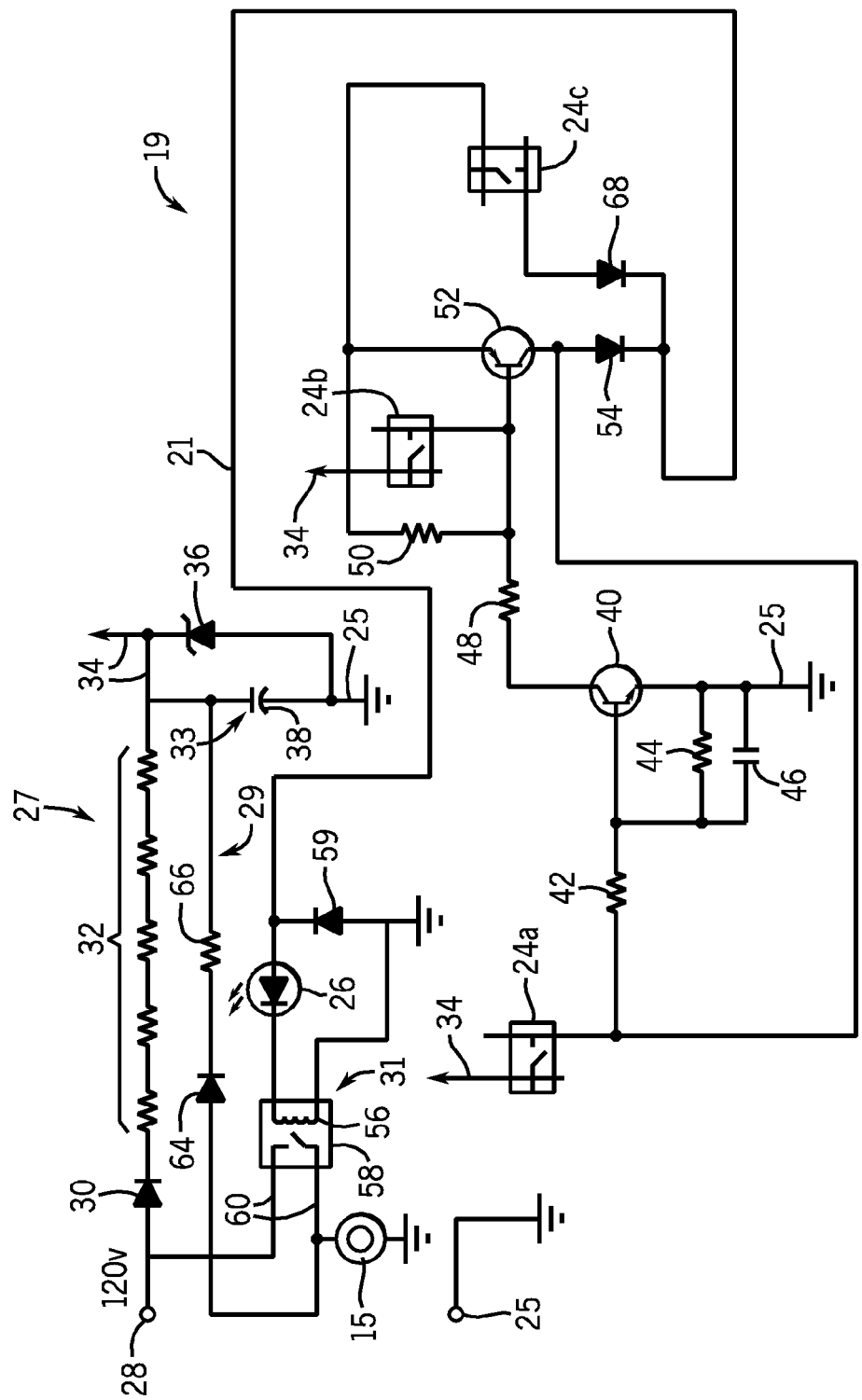
FIG. 3 is a schematic of the electronic control circuit of the present invention.

Referring now to FIG. 3, line voltage 28 may be received by a first power conditioning circuit 27 comprised of a diode 30 and series connected resistors 32. The line voltage 28 is received at an anode of a diode 30 to be rectified and have its voltage dropped by series connected resistors 32. These resistors 32 are, in turn, connected to a 24 V power terminal 34 which also connects to the cathode of the zener diode 36 (having a 24 V breakdown voltage) and a capacitor 38 providing for energy storage. The remaining terminals of the zener diode 36 and capacitor 38 are grounded.

As noted, the diode 30 and resistors 32 provide a first power conditioning circuit 27 for standby power for the remainder of the circuit to be described. In this case, the resistors 32 provide a steady state current draw of less than one milliamp and thus a very low power dissipation both in the resistors 32 and in the zener diode 36. During operation of the first power conditioning circuit, 24 V power is stored up over a period of time in capacitor 38.

Once switch 24a is pressed, a first NPN transistor 40 is turned on by means of 24 V power connected through the switch 24a then through a resistor 42 to the base of the transistor 40. The emitter of the transistor 40 is grounded.

Noise suppression resistor 44 and capacitor 46 are placed in parallel between ground and the base of the transistor 40 to prevent false triggering from coupled of electrical noise.

The collector of the transistor 40 leads to a resistor 48 which in turn connects to a pull-up resistor 50 connected to the terminal 34 and to the base of a second transistor 52. The second transistor 52 is a PNP transistor normally biased off by pull-up resistor 50 but turned on when transistor 40 pulls the base voltage down upon activation of switch 24a. In the on state, current flows into the emitter of transistor 52 from the terminal 34 and out of its collector through a diode 54 and LED 26 to the coil 56 of a relay 58 which makes up the electrically controllable switch 31. The signal through the diode 54 is the motor control signal 21. A flyback diode 59 is placed across the terminals of the coil 56, as is understood in the art, to suppress inductive electrical spikes. The voltage of the collector of transistor 52 is also connected to the junction between switch 24a and resistor 42 to provide "latching" of the transistor 40 even when switch 24a is released. Together the circuitry associated with transistors 40 and 52 makes up the low-voltage logic circuit 19.

The relay 58 includes contacts 60 that are normally open and connect to line voltage 28 on one side and to a motor 15 of the blender 10 on the other side. The remaining terminal of the motor 15 returns through ground 25 which may be shared with line voltage ground. The contacts 60 that are directly connected to the motor 15 also connect to a secondary power conditioning circuit including rectifier diode 64 and resistor 66. Resistor 66 has substantially lower resistance than resistors 32, for example thirty times lower, to provide for higher current necessary to hold the relay coil 56 actuated after depletion of power from capacitor 38 at the expense of substantially increased power dissipation. This higher current from the secondary power conditioning circuit does not overwhelm the wattage rating of the zener diode 36 because the load provided by the coil 56 draws current away from the zener diode 36. This secondary power conditioning circuit of diode 64 and resistor 66 dissipates substantially more energy than the first power conditioning circuit, on the order of 1 W, but only while the motor 15 is running.

When switch 24b is pressed, it connects terminal 34 to the base of transistor 52, turning off transistor 52 and transistor 40 and relay 58 and motor 15. As a result, power from rectifier diodes 64 and resistor 66 is also turned off and power is again received primarily through rectifier diode 30 and resistors 32.

Momentary operation of the motor 15 is obtained by pressing switch 24c which connects terminal 34 to a diode 68 connecting through LED 26 to relay coil 56.

Generally, it will be understood that the relay 58 may be replaced with a triac, for example, with the gate triac receiving the motor control signal 21. The resistors 32, for example, may be in a single integrated package for low-cost installation.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An appliance control circuit for an appliance having a motor switchably connectable to a power line voltage, the appliance control circuit comprising:
   an electromechanical relay having a coil acting on a magnetic armature to open and close contacts across a first terminal and second terminal of an electrically controllable switch, the first terminal of the electrically controllable switch receiving the power line voltage and a second terminal of the electrically controllable switch providing the power line voltage to the motor;
   low-voltage logic circuitry receiving a low-voltage power and a low voltage motor control signal from a low voltage switch for controlling the electromechanical relay according to the motor control signal:
   a first power conditioning circuit receiving the power line voltage and providing the low-voltage power to the low-voltage logic circuitry at a power level insufficient for continuous operation of the electromechanical relay; and
   a second power conditioning circuit receiving power line voltage from the second terminal of the electrically controllable switch and providing the low-voltage power to the low-voltage logic circuitry at a power level sufficient for continuous operation of the electromechanical relay.

2. The appliance control circuit of claim 1 wherein the low-voltage logic circuitry communicates with membrane switches to receive the motor control signal from membrane switches, the latter having contacts formed from printed circuit traces with limited current handling capacity.

3. The appliance control circuit of claim 1 wherein the first power conditioning circuit and second power conditioning circuit are voltage dropping resistors reducing the voltage of line power to the low-voltage power.

4. The appliance control circuit of claim 1 further including a voltage regulator limiting the voltage of the low-voltage power.

5. The appliance control circuit of claim 1 further including an energy storage element storing energy from the first power conditioning circuit to provide temporarily greater power to the low-voltage logic circuitry.

6. The appliance control circuit of claim 1 wherein the low-voltage logic circuitry receives signals from momentary contact push button switches to switch the motor on as long as at least one of the momentary contact push button switches is pressed, to switch the motor on until a second of the at least one momentary contact push button switches is pressed, and to switch the motor off if the motor is on.

7. The appliance control circuit of claim 3 wherein the resistors of the second power conditioning circuit dissipate more power than the resistors of the first power conditioning circuit.

8. The appliance control circuit of claim 4 wherein the voltage regulator is a zener diode attached between the low-voltage power and a ground point.

9. The appliance control circuit of claim 5 wherein the energy storage element is a capacitor attached between the low-voltage power and a ground point.

10. The appliance control circuit of claim 7 wherein the power dissipated by the second power conditioning circuit is greater than a watt and the power dissipated by the first power conditioning circuit is less than one-tenth of a watt.

* * * * *